US012308574B2

(12) United States Patent
Huang et al.

(10) Patent No.: US 12,308,574 B2
(45) Date of Patent: May 20, 2025

(54) ELECTRICAL CONNECTOR WITH IMPROVED STRUCTURE FOR TRANSMITTING RADIO FREQUENCY SIGNAL

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Chenhui Zeng, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 389 days.

(21) Appl. No.: 17/952,686

(22) Filed: Sep. 26, 2022

(65) Prior Publication Data

US 2023/0216248 A1 Jul. 6, 2023

(30) Foreign Application Priority Data

Jan. 5, 2022 (CN) ......................... 202220025914.3

(51) Int. Cl.
*H01R 13/6471* (2011.01)
*H01R 12/57* (2011.01)
(Continued)

(52) U.S. Cl.
CPC ......... *H01R 13/6471* (2013.01); *H01R 12/57* (2013.01); *H01R 12/7005* (2013.01); *H01R 12/716* (2013.01); *H01R 13/516* (2013.01)

(58) Field of Classification Search
CPC ............ H01R 13/6471; H01R 13/6591; H01R 13/6597; H01R 13/6599; H01R 12/714; H01R 12/716; H01R 12/721
(Continued)

(56) References Cited

U.S. PATENT DOCUMENTS 5,221,218 A * 6/1993 Marach .................. H01R 13/26 439/637
5,735,696 A * 4/1998 Niitsu .................... H01R 12/57 439/83
(Continued)

FOREIGN PATENT DOCUMENTS

CN 210156593 U * 3/2020 ............. H01R 12/55
CN 111244686 A * 6/2020 ......... H01R 12/7082
(Continued)

OTHER PUBLICATIONS

KR101568858B1 with translation (Year: 2015).*

*Primary Examiner* — Marcus E Harcum
(74) *Attorney, Agent, or Firm* — Birch, Stewart, Kolasch & Birch, LLP

(57) ABSTRACT

An electrical connector includes an insulating body, a number of first conductive terminals and a number of second conductive terminals. The insulating body includes a mating slot for receiving a mating board. Each first conductive terminal includes a first extension arm having a first mating portion. Each second conductive terminal includes a second extension arm having a second mating portion. The first mating portion and the second mating portion are adapted to jointly clamp the mating board. Extension directions of the first extension arm and the second extension arm are opposite to each other. The first conductive terminals or the second conductive terminals include at least one radio frequency signal terminal for transmitting a radio frequency signal.

20 Claims, 17 Drawing Sheets

(51) Int. Cl.
*H01R 12/70* (2011.01)
*H01R 12/71* (2011.01)
*H01R 13/516* (2006.01)

(58) Field of Classification Search
USPC ........... 439/74, 65, 637, 59, 607.31, 607.32, 439/607.33, 607.34
See application file for complete search history.

(56) References Cited

U.S. PATENT DOCUMENTS

| | | | | | |
|---|---|---|---|---|---|
| 6,592,407 | B2 * | 7/2003 | Korunsky | H01R 12/721 | 439/108 |
| 6,716,039 | B1 * | 4/2004 | Peloza | H01R 12/7011 | 439/83 |
| 7,833,068 | B2 * | 11/2010 | Bright | H01R 13/502 | 439/733.1 |
| 8,167,631 | B2 * | 5/2012 | Ito | H01R 12/721 | 439/108 |
| 8,292,669 | B2 * | 10/2012 | Wang | H01R 12/721 | 439/607.2 |
| 8,328,565 | B2 * | 12/2012 | Westman | H01R 13/6471 | 439/682 |
| 8,506,333 | B2 * | 8/2013 | Wang | H01R 12/721 | 439/626 |
| 8,545,240 | B2 * | 10/2013 | Casher | H01R 13/6474 | 439/108 |
| 8,858,237 | B2 * | 10/2014 | Hsu | H01R 13/514 | 439/60 |
| 8,944,863 | B1 * | 2/2015 | Yang | H01R 13/6585 | 439/733.1 |
| 8,979,558 | B2 * | 3/2015 | Rubens | H01R 31/06 | 439/131 |
| 9,083,130 | B2 * | 7/2015 | Casher | H01R 12/00 | |
| 9,401,570 | B2 * | 7/2016 | Phillips | H01R 13/6583 | |
| 9,634,432 | B2 * | 4/2017 | Su | H01R 13/6471 | |
| 9,705,218 | B2 * | 7/2017 | Ito | H01R 13/6471 | |
| 9,979,136 | B1 * | 5/2018 | Wu | H01R 13/6597 | |
| 10,998,679 | B2 * | 5/2021 | Long | H01R 13/6587 | |
| 11,600,950 | B2 * | 3/2023 | Takai | H05K 1/181 | |
| 11,658,441 | B2 * | 5/2023 | Li | H01R 13/405 | 439/607.41 |
| 11,817,655 | B2 * | 11/2023 | Liu | H01R 13/6471 | |
| 2013/0089991 | A1 * | 4/2013 | Ito | H01R 12/721 | 439/65 |
| 2013/0157480 | A1 * | 6/2013 | Swedberg | H01R 12/515 | 439/65 |
| 2015/0140866 | A1 * | 5/2015 | Tsai | H01R 12/724 | 439/637 |
| 2015/0171574 | A1 * | 6/2015 | Little | H01R 13/6658 | 439/78 |
| 2016/0211629 | A1 * | 7/2016 | Phillips | H01R 13/6471 | |
| 2017/0133777 | A1 * | 5/2017 | Little | H01R 12/721 | |
| 2019/0173209 | A1 * | 6/2019 | Lu | H01R 12/716 | |
| 2019/0326710 | A1 * | 10/2019 | Little | H01R 13/6582 | |
| 2020/0076135 | A1 * | 3/2020 | Tang | H01R 12/721 | |
| 2020/0244014 | A1 * | 7/2020 | Lin | H01R 13/6471 | |
| 2021/0194187 | A1 * | 6/2021 | Chen | H01R 4/04 | |
| 2021/0226366 | A1 * | 7/2021 | Hung | H01R 13/516 | |
| 2022/0029360 | A1 * | 1/2022 | Little | H01R 13/405 | |
| 2022/0344877 | A1 * | 10/2022 | Lin | H01R 13/6597 | |
| 2022/0399663 | A1 * | 12/2022 | Chang | H01R 12/675 | |

FOREIGN PATENT DOCUMENTS

| | | | | |
|---|---|---|---|---|
| CN | 111293462 A | * | 6/2020 | H01R 12/716 |
| CN | 111326917 A | * | 6/2020 | H01R 12/55 |
| CN | 111564722 A | * | 8/2020 | H01R 12/73 |

* cited by examiner

ELECTRICAL CONNECTOR WITH IMPROVED STRUCTURE FOR TRANSMITTING RADIO FREQUENCY SIGNAL

CROSS-REFERENCE TO RELATED APPLICATION

This patent application claims priority of a Chinese Patent Application No. 202220025914.3, filed on Jan. 5, 2022 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

Existing electrical connectors are widely adapted in the field of communications. These electrical connectors include radio frequency connectors. An existing radio frequency connector typically include a centrally located signal pin and a shielding ring surrounding the signal pin. The radio frequency connector of this structure has high reliability and strong anti-noise ability, but its disadvantage is that the structure is relatively complicated and the cost is relatively high.

SUMMARY

An object of the present disclosure is to provide an electrical connector with improved structure for transmitting a radio frequency signal.

In order to achieve the above object, the present disclosure adopts the following technical solution: an electrical connector, including: an insulating body including a mating surface and a mating slot extending through the mating surface, the mating slot being adapted for receiving a mating board; a plurality of first conductive terminals, each of the first conductive terminals including a first extension arm, the first extension arm including a first mating portion which protrudes into the mating slot; and a plurality of second conductive terminals, each of the second conductive terminals including a second extension arm, the second extension arm including a second mating portion which protrudes into the mating slot; wherein the first mating portion and the second mating portion are located on opposite sides of the mating slot, respectively; the first mating portion and the second mating portion are adapted to jointly clamp the mating board; and extension directions of the first extension arm and the second extension arm are opposite to each other; and wherein the plurality of first conductive terminals or the plurality of second conductive terminals include at least one radio frequency signal terminal.

In order to achieve the above object, the present disclosure adopts the following technical solution: an electrical connector, including: an insulating body including a mating surface and a mating slot extending through the mating surface, the mating slot being adapted for receiving a mating board; a first terminal module assembled to the insulating body, the first terminal module including a first insulating block and a plurality of first conductive terminals secured to the first insulating block, each of the first conductive terminals including a first extension arm, the first extension arm including a first mating portion which protrudes into the mating slot; and a second terminal module assembled to the insulating body, the second terminal module including a second insulating block and a plurality of second conductive terminals secured to the second insulating block, each of the second conductive terminals including a second extension arm, the second extension arm including a second mating portion which protrudes into the mating slot; wherein the first mating portion and the second mating portion are located on opposite sides of the mating slot, respectively; the first mating portion and the second mating portion are adapted to jointly clamp the mating board; wherein the first terminal module and the second terminal module are assembled to the insulating body along opposite directions; wherein the plurality of first conductive terminals or the plurality of second conductive terminals include at least one radio frequency signal terminal.

Compared with the prior art, in the present disclosure, at least one radio frequency signal terminal for transmitting a radio frequency signal is provided in the plurality of first conductive terminals or the plurality of second conductive terminals, thereby simplifying the structure of the electrical connector.

DETAILED DESCRIPTION

Figure 1:
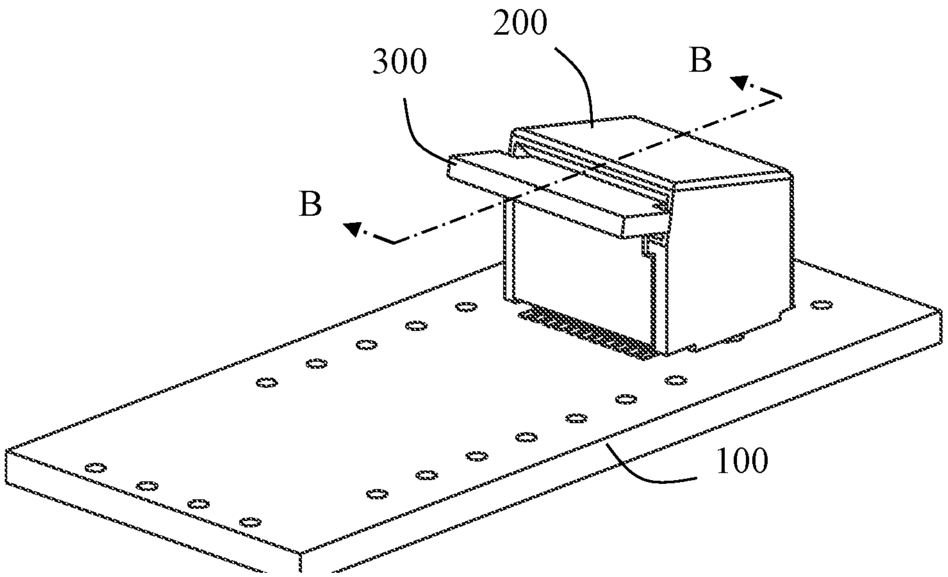
FIG. 1 is a schematic perspective view of an electrical connector assembly in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 5, the present disclosure discloses an electrical connector assembly for transmitting radio frequency (RF) signals. The electrical connector assembly includes a circuit board 100 and an electrical connector 200 mounted on the circuit board 100. In the illustrated embodiment of the present disclosure, the electrical connector 200 is a high-speed connector. The electrical connector 200 is mounted to the circuit board 100 by surface soldering. Of course, in other embodiments, the electrical connector 200 may also be mounted to the circuit board 100 by through-hole soldering, which is well-known to those of ordinary skill in the art and will not be repeated in the present disclosure. The electrical connector 200 is adapted for receiving a mating board 300.

Figure 2:
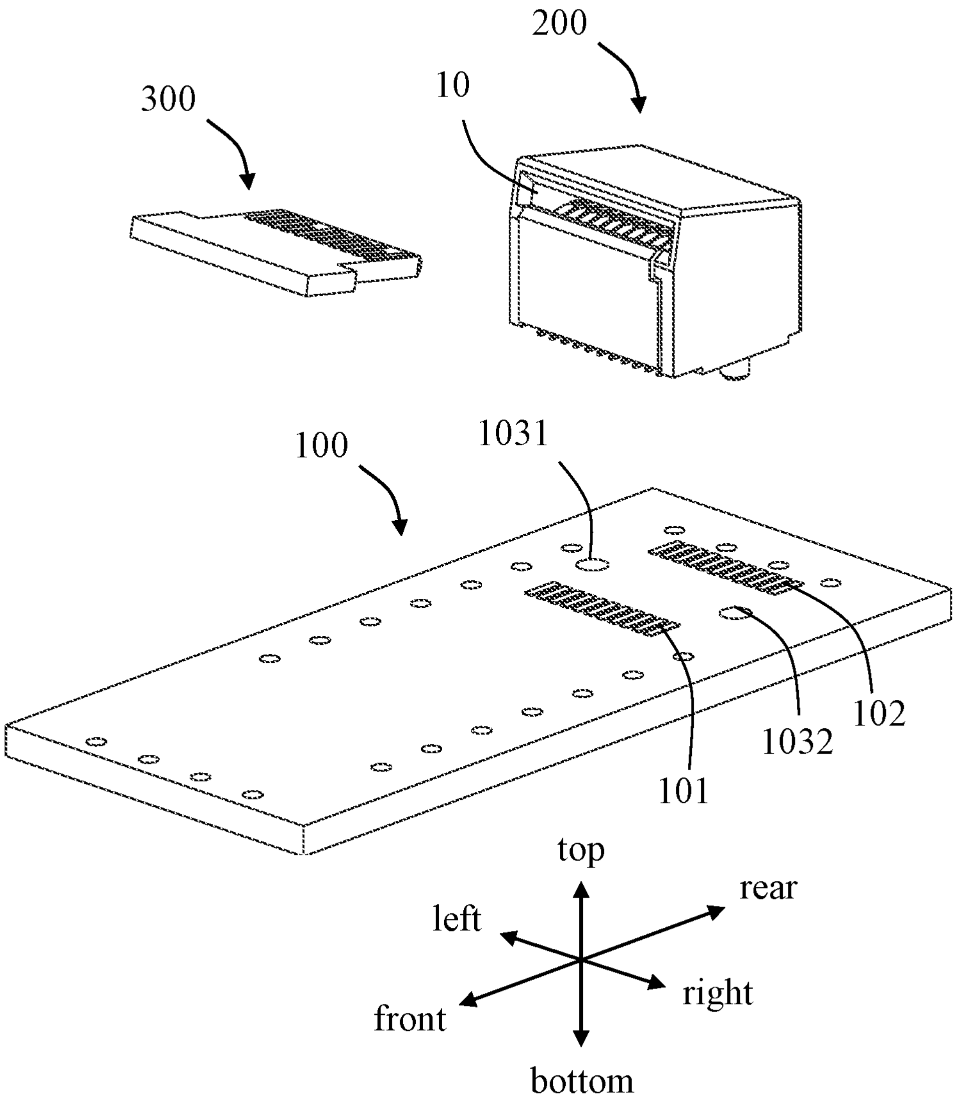
FIG. 2 is a partial perspective exploded view of FIG. 1.
Figure 3:
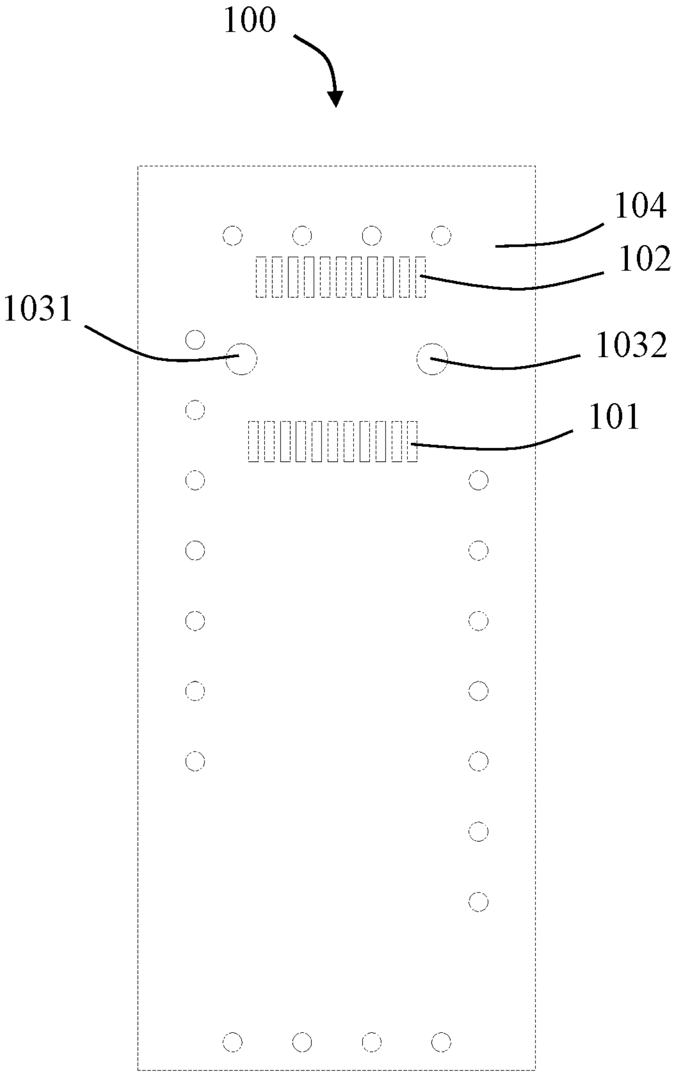
FIG. 3 is a top view of a circuit board in FIG. 2.
Figure 4:
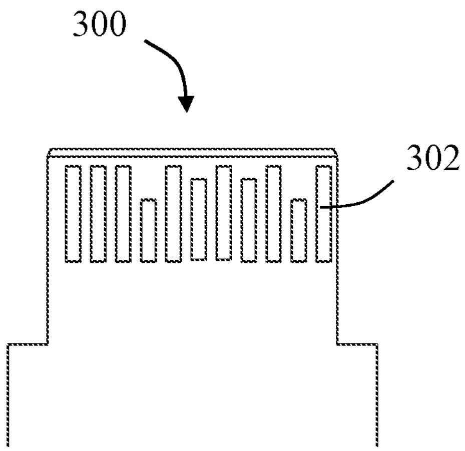
FIG. 4 is a top view of a mating board in FIG. 2.
Figure 5:
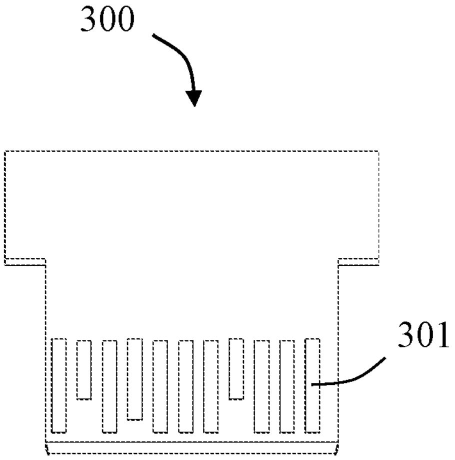
FIG. 5 is a bottom view of the mating board in FIG. 4.
Figure 6:
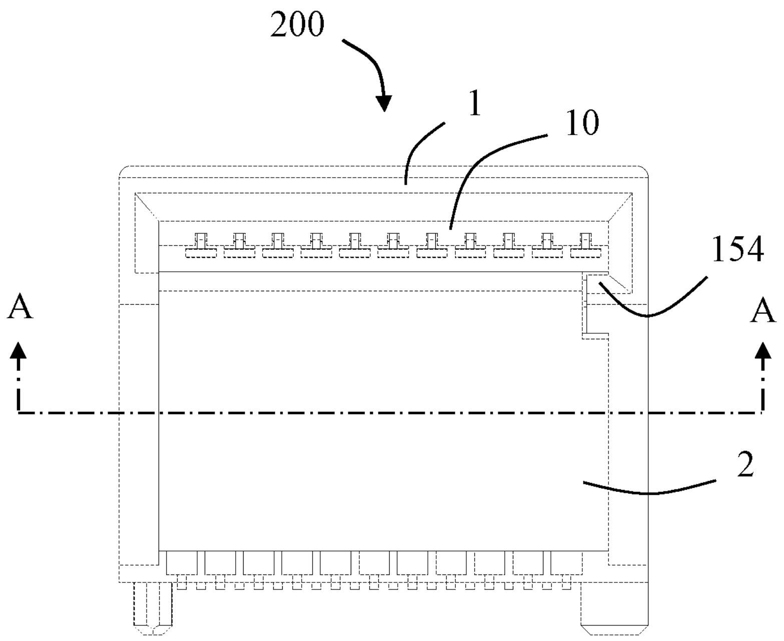
FIG. 6 is a front view of an electrical connector in FIG. 2.

Referring to FIGS. 2 and 3, in an embodiment of the present disclosure, the circuit board 100 includes a plurality of first soldering pads 101 formed on an upper surface 104 thereof, a plurality of second soldering pads 102 formed on the upper surface 104, and a plurality of mounting holes located between the plurality of first soldering pads 101 and the plurality of second soldering pads 102 in a front-rear direction. In the embodiment shown in the present disclosure, the plurality of first soldering pads 101 are arranged at intervals along a left-right direction and are arranged in a first row. The plurality of second soldering pads 102 are arranged at intervals along the left-right direction and are arranged in a second row. The plurality of first soldering pads 101 and the plurality of second soldering pads 102 are parallel to each other. In the embodiment shown in the present disclosure, the plurality of first soldering pads 101 and the plurality of second soldering pads 102 are staggered along the front-rear direction. That is, the first soldering pads 101 and the second soldering pads 102 at corresponding positions are not aligned along the front-rear direction. This arrangement is beneficial to arranging the plurality of first soldering pads 101 and the plurality of second soldering pads 102 more flexibly, reducing the possibility that the plurality of first soldering pads 101 and the plurality of second soldering pads 102 interfere with each other. In the illustrated embodiment of the present disclosure, the plurality of mounting holes include a first mounting hole 1031 and a second mounting hole 1032 which are spaced apart from each other along the left-right direction.

In the illustrated embodiment of the present disclosure, the mating board 300 is a printed circuit board which includes a plurality of first conductive pads 301 located on a first surface (e.g., an upper surface) and a plurality of second conductive pads 302 located on a second surface (e.g., a lower surface). Of course, in other embodiments, the mating board 300 may also be a tongue plate of a mating connector. The tongue plate includes a plurality of first conductive pads 301 located on a first surface (e.g., an upper surface) and a plurality of second conductive pads 302 located on a second surface (e.g., a lower surface). When the mating connector is mated with the electrical connector 200, the tongue plate is inserted into the electrical connector 200. Those skilled in the art can understand the mating connector provided with the tongue plate, which will not be repeated in the present disclosure.

Referring to FIGS. 6 to 11, in the embodiment shown in the present disclosure, the electrical connector 200 includes an insulating body 1, a first terminal module 2 assembled to the insulating body 1 and a second terminal module 3 assembled to the insulating body 1.

Figure 7:
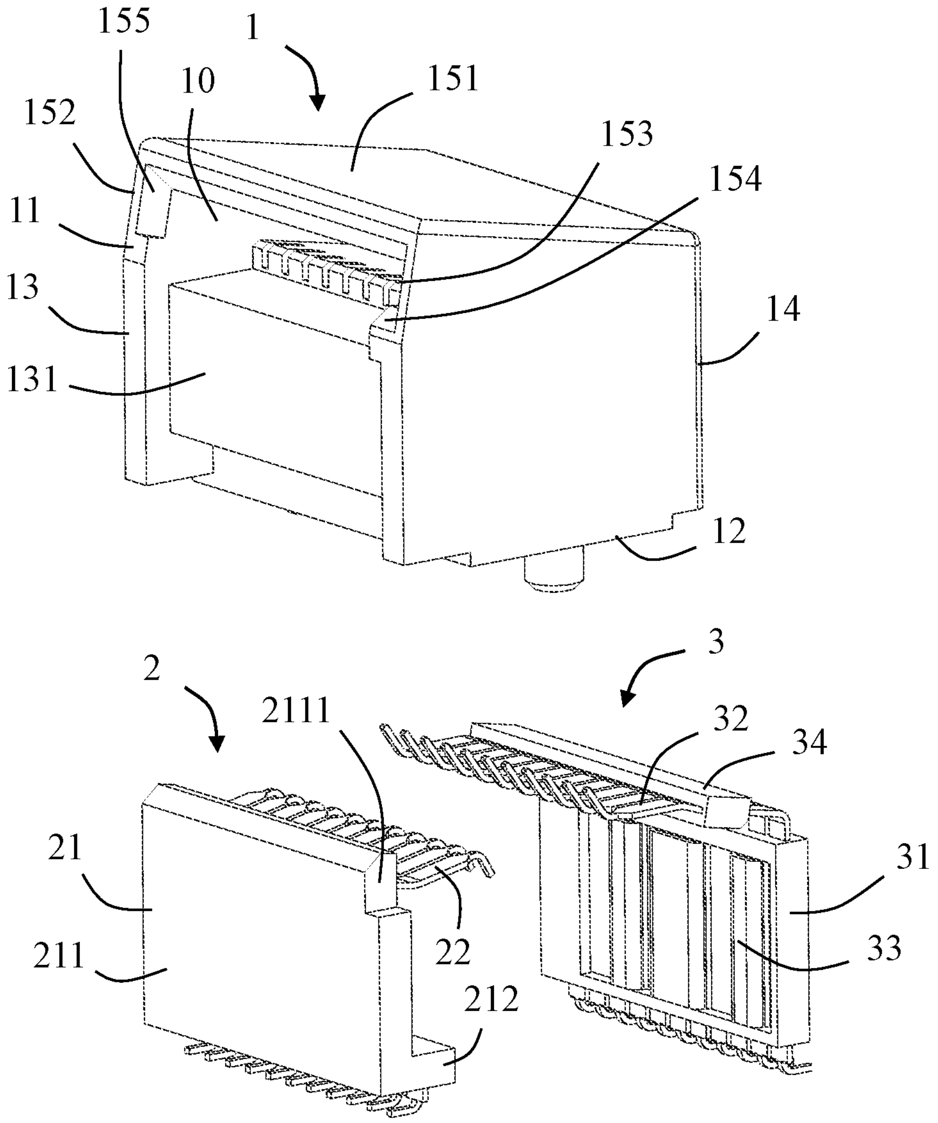
FIG. 7 is a partial perspective exploded view of the electrical connector in FIG. 2.
Figure 8:
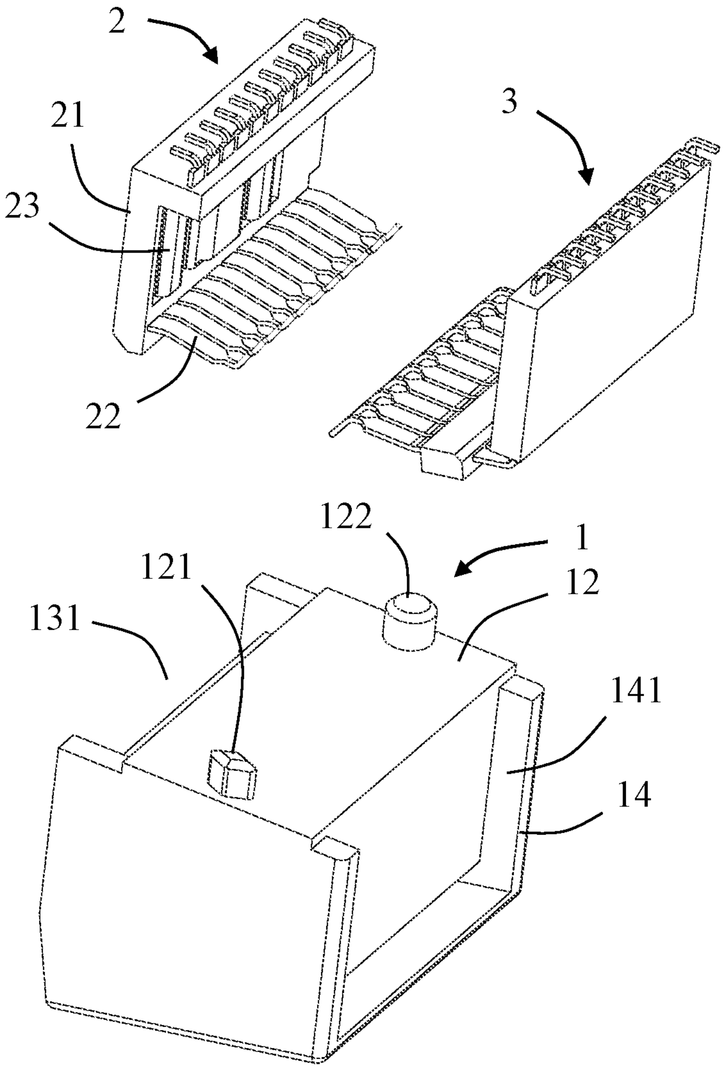
FIG. 8 is a partially exploded perspective view of FIG. 7 from another angle.
Figure 9:
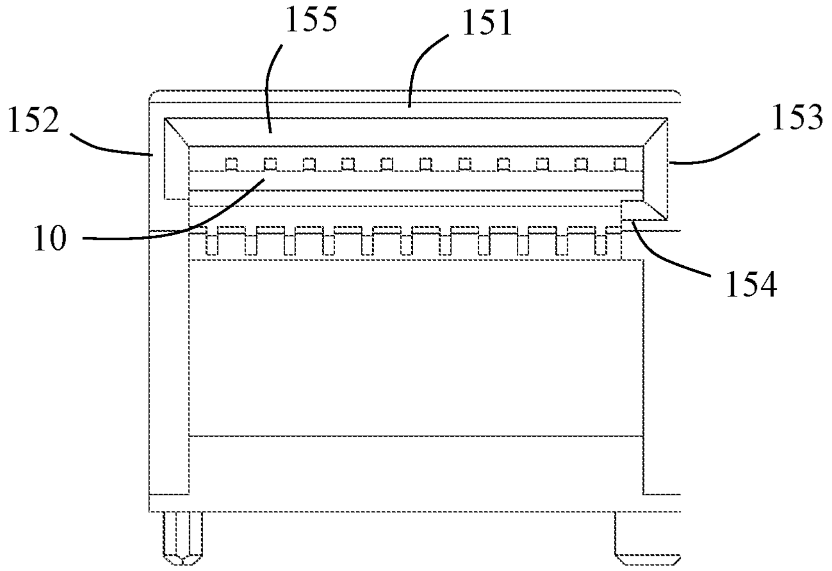
FIG. 9 is a front view of an insulating body in FIG. 6.
Figure 10:
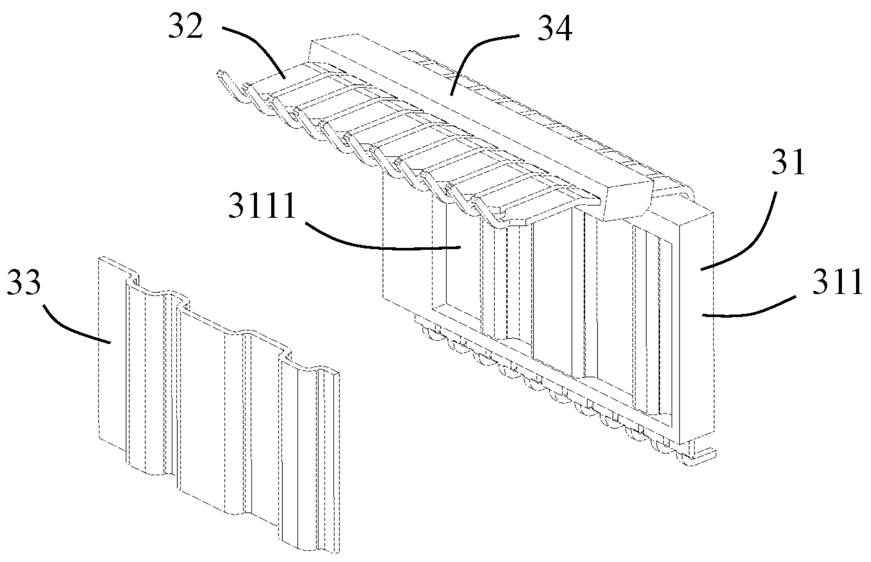
FIG. 10 is a partial perspective exploded view of a second terminal module in FIG. 7.
Figure 11:
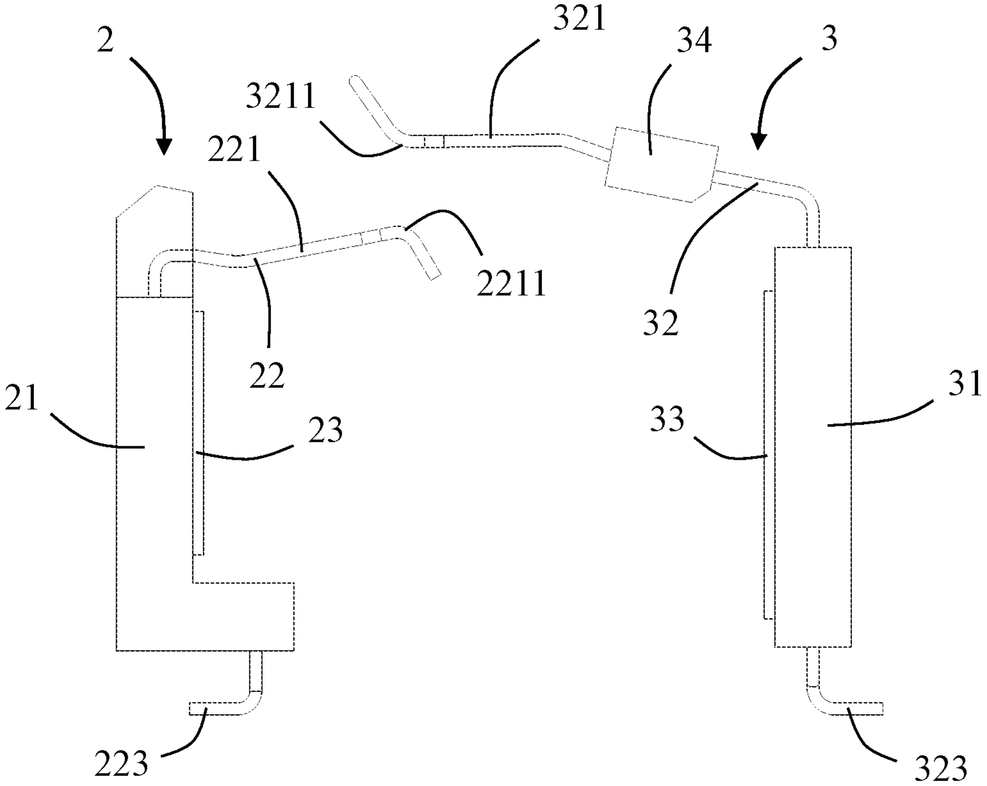
FIG. 11 is a side view of a first terminal module and the second terminal module in FIG. 7.

Referring to FIGS. 7 to 9, in the embodiment shown in the present disclosure, the insulating body 1 includes a mating surface 11, a mating slot 10 extending through the mating surface 11, and a mounting surface 12 for mounting the electrical connector 200 onto the circuit board 100. The mating slot 10 is adapted for receiving the mating board 300. The mating surface 11 is located at a front end of the insulating body 1. The mounting surface 12 is located at a bottom end of the insulating body 1. The insulating body 1 further includes a first mounting post 121 and a second mounting post 122 which protrude downwardly from the mounting surface 12. The first mounting post 121 and the second mounting post 122 are adapted for being mounted in the first mounting hole 1031 and the second mounting hole 1032, respectively, to achieve mounting and positioning purposes. In the embodiment shown in the present disclosure, the shapes of the first mounting post 121 and the second mounting post 122 are different, so as to facilitate distinction during installation and avoid wrong installation. Specifically, in the embodiment shown in the present disclosure, the first mounting post 121 is polygonal, and the second mounting post 122 is cylindrical. Of course, in other embodiments, the first mounting post 121 and the second mounting post 122 may also have other shapes, which will not be described in detail in the present disclosure.

The insulating body 1 includes a first side 13 (e.g., a front side) located on a same side as the mating surface 11, a second side 14 (e.g., a rear side) opposite the first side 13, a first receiving space 131 recessed from the first side 13 toward the second side 14, and a second receiving space 141 recessed from the second side 14 toward the first side 13. The first terminal module 2 and the second terminal module 3 are assembled to the insulating body 1 along opposite directions. In the embodiment shown in the present disclosure, the first terminal module 2 is installed in the first receiving space 131 of the insulating body 1 along a frontto-rear direction. The second terminal module 3 is installed in the second accommodating space 141 of the insulating body 1 along a rear-to-front direction. With this arrangement, the first terminal module 2 and the second terminal module 3 are generally located on a front side and a rear side of the insulating body 1, respectively, which reduces the possible interference between the first terminal module 2 and the second terminal module 3, including but not limited to assembly interference and signal transmission interference.

Referring to FIGS. 7 and 9, the insulating body 1 includes a top wall 151, a first side wall 152 connected to one side (e.g., a left side) of the top wall 151, a second side wall 153 connected to another side (e.g., a right side) of the top wall 151, and a bottom wall 154 opposite to the top wall 152. The mating slot 10 is located between the first side wall 152 and the second side wall 153 in the left-right direction. The mating slot 10 is also located between the top wall 151 and the bottom wall 154 in a top-bottom direction.

In the illustrated embodiment of the present disclosure, the bottom wall 154 is only located on a side adjacent to the first side wall 152. That is, at a position adjacent to the second side wall 153, the mating slot 10 extends downwardly therethrough. Of course, in other embodiments, the bottom wall 154 may also be located only on a side adjacent to the second side wall 153. That is, at a position close to the first side wall 152, the mating slot 10 extend downwardly therethrough. The bottom wall 154 is integrally formed with the insulating body 1. In the present disclosure, by providing the bottom wall 154, a strong structural support can be provided to the mating board 300, thereby improving the mating reliability. In the embodiment shown in the present disclosure, the top wall 151, the first side wall 152, the second side wall 153 and the bottom wall 154 are all provided with guiding slopes 155. These guiding slopes 155 together form a bell mouth for guiding the mating board 300 so as to facilitate insertion of the mating board 300.

Referring to FIGS. 7, 8, 11 and 15, the first terminal module 2 includes a first insulating block 21, a plurality of first conductive terminals 22 secured to the first insulating block 21, and a first shielding piece 23 fixed to the first insulating block 21. In the embodiment shown in the present disclosure, the plurality of first conductive terminals 22 are insert-molded with the first insulating block 21. Of course, in other embodiments, the plurality of first conductive terminals 22 can also be secured to the first insulating block 21 by assembling or the like; or the plurality of first conductive terminals 22 can be directly assembled and secured to the insulating body 1.

In the embodiment shown in the present disclosure, the first insulating block 21 is substantially L-shaped, and includes a first vertical portion 211 and a first horizontal portion 212. The first horizontal portion 212 extends from a bottom of the first vertical portion 211 toward the second terminal module 3. An upper right corner of the first vertical portion 211 is provided with a notch 2111 which is adapted to match with the bottom wall 154.

Referring to FIGS. 11 to 15, the plurality of first conductive terminals 22 are arranged in a row along the left-right direction. Each of the first conductive terminals 22 includes a first extension arm 221, a first fixing portion 222 connected with the first extension arm 221, and a first tail portion 223 for being fixed to the circuit board 100. The first extension arm 221 protrudes beyond the first insulating block 21. The first extension arm 221 includes a first mating portion 2211 protruding into the mating slot 10. The first fixing portion 222 is fixed in the first insulating block 21. The first tail portion 223 extends horizontally in a direction away from the second terminal module 3. For example, the first tail portion 223 extends horizontally forward.

Specifically, in the embodiment shown in the present disclosure, each first conductive terminal 22 includes a first bent portion 224 bent from a bottom of the first fixing portion 222 toward the second terminal module 3, and a second bent portion 225 bent downwardly from the first bent portion 224. The first tail portion 223 is horizontally bent from the bottom of the second bent portion 225. This design facilitates adjusting the position of the first tail portion 223, thereby facilitating the soldering and fixing of the first tail portion 223 and the first soldering pad 101.

Figure 15:
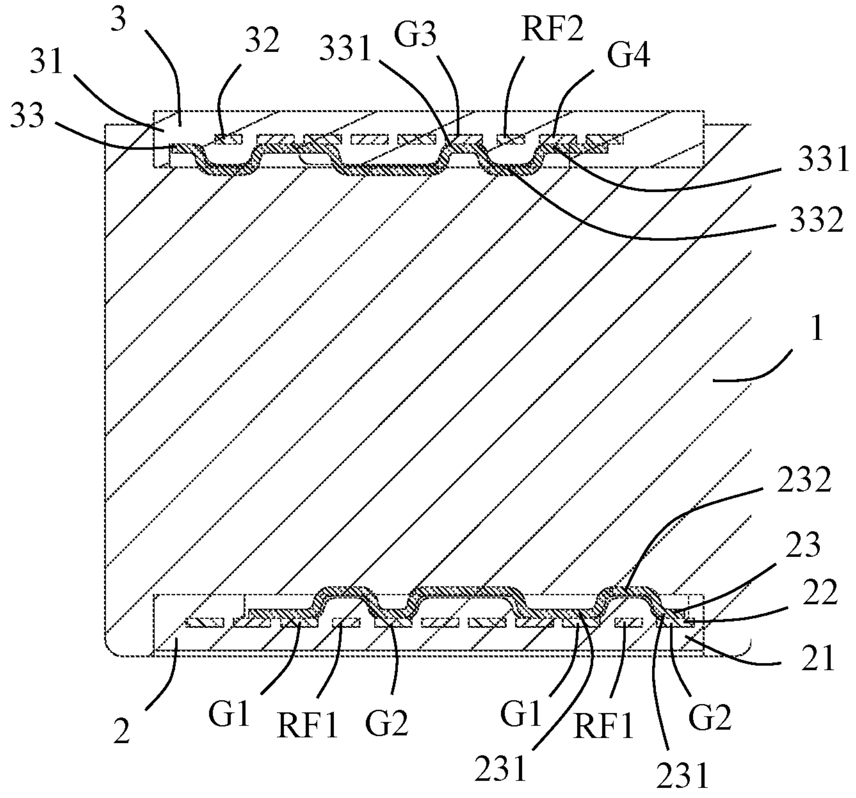
FIG. 15 is a schematic cross-sectional view taken along line A-A in FIG. 6.

Referring to FIG. 15, the plurality of first conductive terminals 22 include a plurality of first radio frequency signal terminals RF1, a plurality of first ground terminals G1 and a plurality of second ground terminals G2. The left and right sides of each first radio frequency signal terminal RF1 are respectively provided with one of the first ground terminals G1 which is adjacent to the first radio frequency signal terminal RF1 and one of the second ground terminals G2 which adjacent to the first radio frequency signal terminal RF1. The first radio frequency signal terminal RF1 is adapted for transmitting a radio frequency signal. The first shielding piece 23 includes a plurality of first contacting portions 231 for connecting the first ground terminals G1 and the second 331 ground terminals G2 in series, and a plurality of first raised portions 232 located between two adjacent first contacting portions 231. Each first raised portion 232 protrudes in a direction away from the first radio frequency signal terminal RF1, so as to prevent the first shielding piece 23 from being short-circuited due to contact with the first radio frequency signal terminal RF1. By providing the first shielding piece 23 and the first ground terminal G1 and the second ground terminal G2 on opposite sides of the first radio frequency signal terminal RF1, the present disclosure reduces the crosstalk, and improves the anti-interference capability of the first radio frequency signal terminal RF1 during signal transmission.

Referring to FIGS. 7 to 15, the second terminal module 3 includes a second insulating block 31, a plurality of second conductive terminals 32 secured to the second insulating block 31, and a second shielding piece 33 fixed to the second insulating block 31. In the embodiment shown in the present disclosure, the plurality of first conductive terminals 32 are insert-molded with the second insulating block 31. Of course, in other embodiments, the plurality of second conductive terminals 32 can also be fixed to the second insulating block 31 by assembling or the like; or the plurality of second conductive terminals 32 can be directly assembled and fixed to the insulating body 1.

In the illustrated embodiment of the present disclosure, the second insulating block 31 includes a second vertical portion 311. The second vertical portion 311 is provided with a hollow slot 3111 for installing the second shielding piece 33.

The plurality of second conductive terminals 32 are arranged in a row along the left-right direction. Each of the second conductive terminals 32 includes a second extension arm 321, a second fixing portion 322 connected to the second extension arm 321, and a second tail portion 323 for being fixed to the circuit board 100. The second extension arm 321 protrudes beyond the second insulating block 31. The second extension arm 321 includes a second mating portion 3211 protruding into the mating slot 10. The positions of the first mating portion 2211 and the second mating portion 3211 in the vertical direction are disposed corresponding to each other, so as to jointly clamp the mating board 300. The first mating portion 2211 is adapted for contacting the first conductive pad 301. The second mating portion 3211 is adapted for contacting the second conductive pad 302. Extension directions of the first extension arm 221 and the second extension arm 321 are opposite to each other so as to facilitate arrangement. In the embodiment shown in the present disclosure, a length of the second extension arm 321 is greater than a length of the first extension arm 221. The second terminal module 3 further includes a fixing block 34 fixed at the middle of the second extension arm 321 so as to balance the elastic force of the second extension arm 321. The second fixing portion 322 is fixed in the second insulating block 31. The second tail portion 323 extends horizontally in a direction away from the first tail portion 223. For example, the second tail portion 323 extends horizontally backward. This arrangement reduces possible interference between the second tail portion 323 and the first tail portion 223, and reduces the difficulty of arrangement. The second tail portion 323 is adapted for being soldered with the second soldering pad 102.

Referring to FIG. 15, the plurality of second conductive terminals 32 include a second radio frequency signal terminal RF2, a third ground terminal G3 and a fourth ground terminal G4. Opposite sides of the second radio frequency signal terminal RF2 are respectively provided with a third ground terminal G3 which is adjacent to the second radio frequency signal terminal RF2 and a fourth ground terminal G4 which is adjacent to the second radio frequency signal terminal RF2. The second radio frequency signal terminal RF2 is adapted for transmitting a radio frequency signal. The second shielding piece 33 includes a plurality of second contacting portions 331 for connecting the third ground terminals G3 and the fourth ground terminals G4 in series, and a plurality of second raised portions 332 located between two adjacent second contacting portions 331. Each second raised portion 332 protrudes in a direction away from the second radio frequency signal terminal RF2, so as to prevent the second shielding piece 33 from being short-circuited due to contact with the second radio frequency signal terminal RF2. By providing the second shielding piece 33 and the third ground terminal G3 and the fourth ground terminal G4 on opposite sides of the second radio frequency signal terminal RF2, the present disclosure reduces the crosstalk, and improves the anti-interference capability of the second radio frequency signal terminal RF2 during signal transmission.

Figure 12:
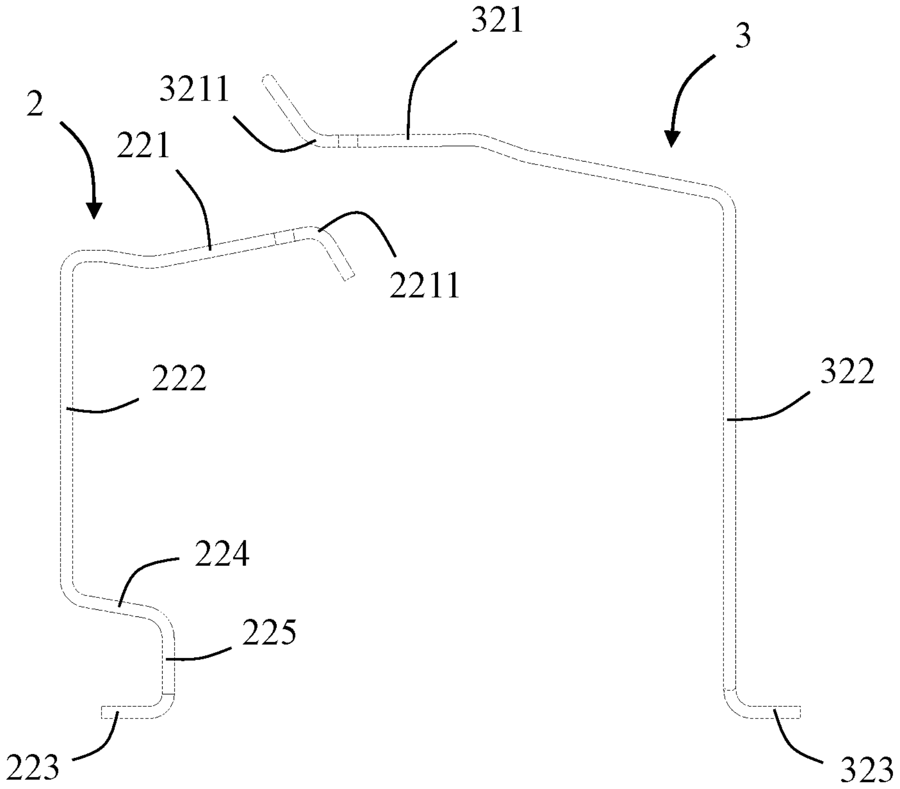
FIG. 12 is a side view of first conductive terminals and second conductive terminals in FIG. 11.

In addition, in the embodiment shown in the present disclosure, the first fixing portion 222 and the second fixing portion 322 both extend along the vertical direction. The first shielding piece 23 extends in the vertical direction. The second shielding piece 33 extends in the vertical direction. The first shielding piece 23 and the second shielding piece 33 are both located between the first fixing portion 222 and the second fixing portion 322 in the front-rear direction. With this arrangement, the crosstalk between the first conductive terminal 22 and the second conductive terminal 32 is further reduced, and the signal transmission quality is improved. Referring to FIG. 12, the first mating portion 2211 and the second mating portion 3211 are located between the first tail portion 223 and the second tail portion 323 in the front-rear direction. This arrangement is also beneficial to improve the quality of signal transmission.

Figure 13:
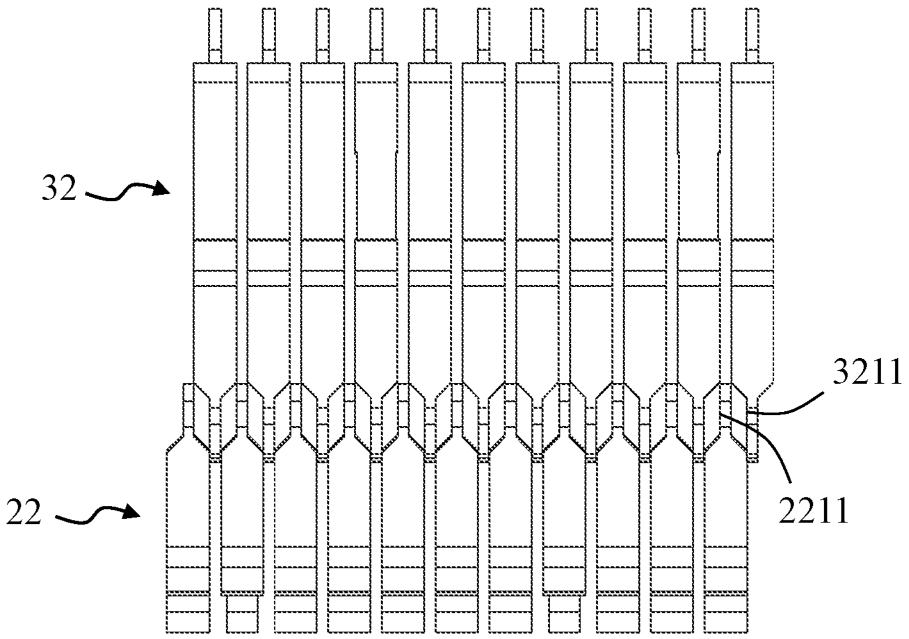
FIG. 13 is a top view of the first conductive terminals and the second conductive terminals in FIG. 11.
Figure 14:
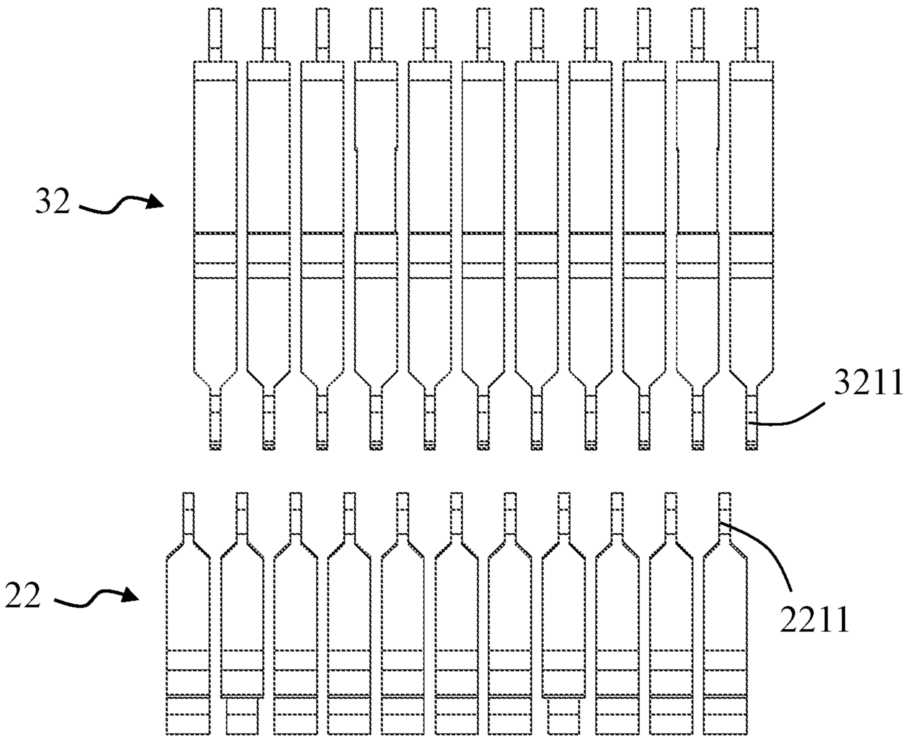
FIG. 14 is a top view of the first conductive terminals and the second conductive terminals in FIG. 13 when they are separated by a certain distance.

Referring to FIGS. 13 and 14, in the embodiment shown in the present disclosure, the plurality of first conductive terminals 22 and the plurality of second conductive terminals 32 are staggered along the front-rear direction. This arrangement is beneficial to reduce the interference between the first conductive terminals 22 and the second conductive terminals 32, and improve the flexibility of terminal arrangement. In the embodiment shown in the present disclosure, by arranging the first bent portion 224 and the second bent portion 225, the length of the first conductive terminal 22 is appropriately increased, so that the first conductive terminal 22 can be closer to the length of the second conductive terminal 32, which is beneficial to improve the quality of signal transmission.

Figure 16:
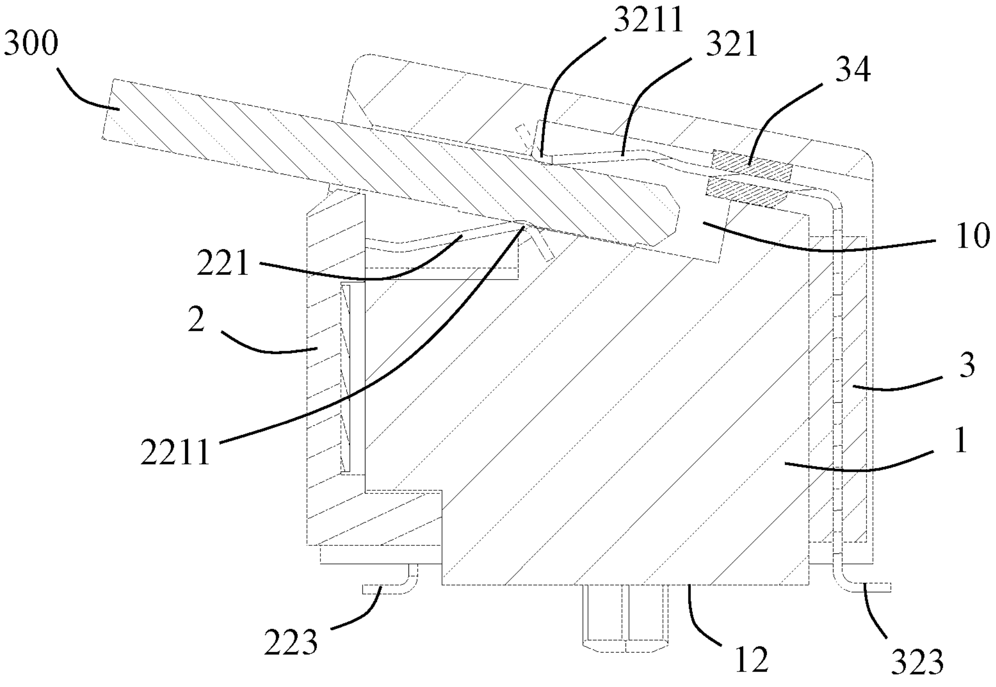
FIG. 16 is a schematic cross-sectional view taken along line B-B in FIG. 1, wherein the circuit board is not shown.
Figure 17:
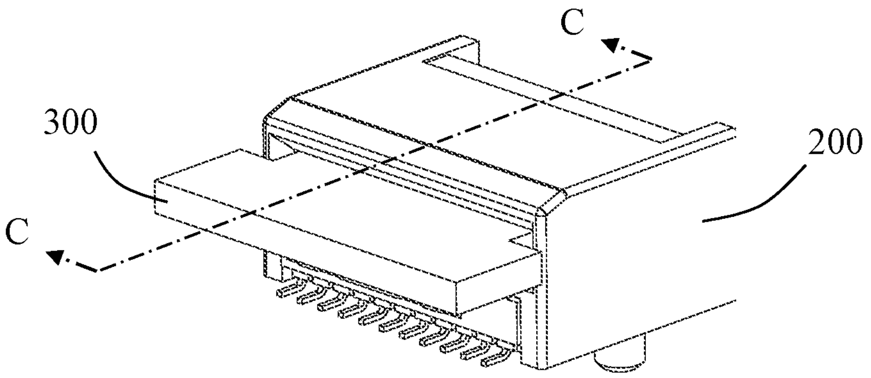
FIG. 17 is a schematic perspective view of the electrical connector assembly in accordance with a second embodiment of the present disclosure.
Figure 18:
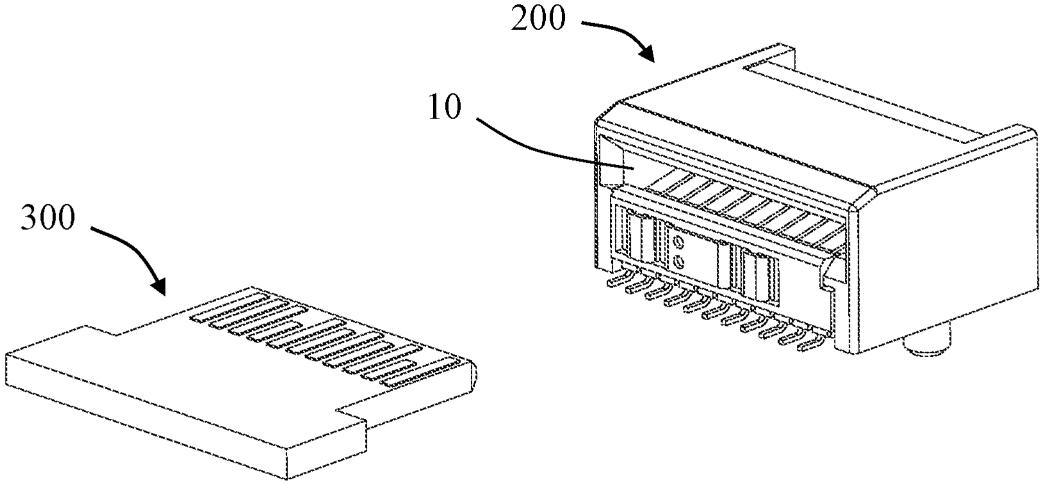
FIG. 18 is a partial perspective exploded view of FIG. 17.
Figure 19:
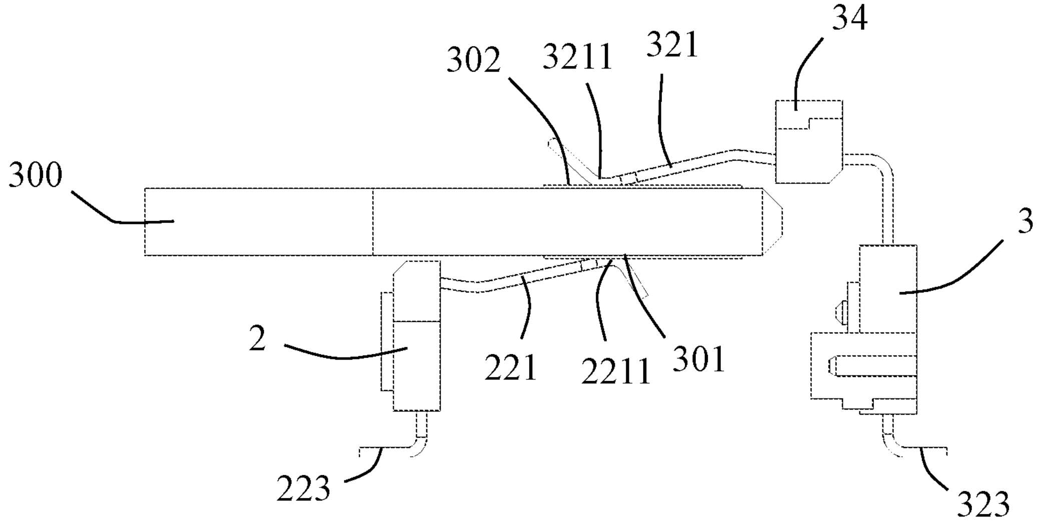
FIG. 19 is a side view of the first terminal module and the second terminal module in FIG. 17 when mated with the mating board.
Figure 20:
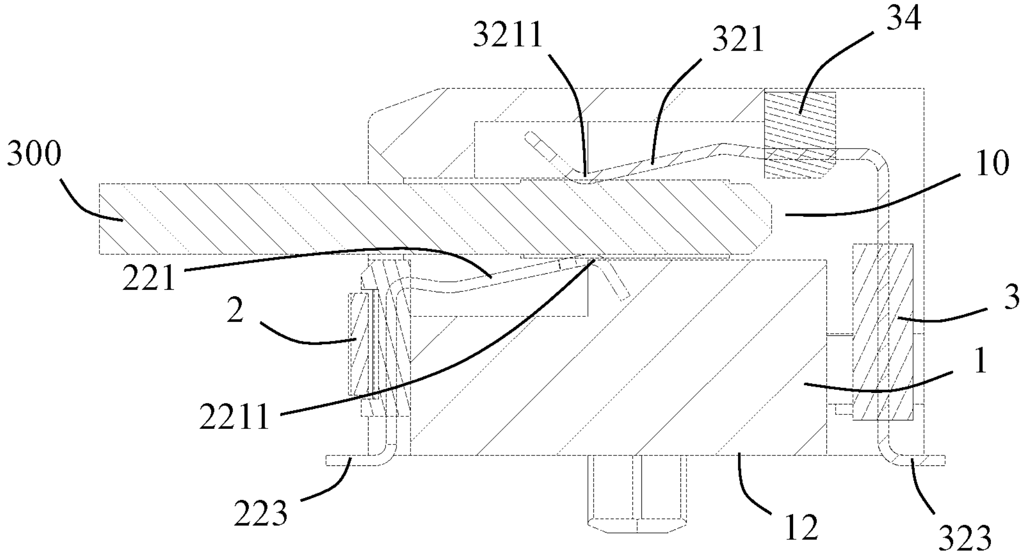
FIG. 20 is a schematic cross-sectional view taken along line C-C in FIG. 17.

Referring to FIG. 16, in the first embodiment of the present disclosure, the mating slot 10 is arranged obliquely. The mating slot 10 and the mounting surface 12 form an included angle of less than 90°. This design can improve the convenience of inserting the mating board 300 in some cases where the boundary conditions are limited. At the same time, it is also beneficial to keep the mating board 300 in the mating slot 10 and reduce the risk of the mating board 300 from falling out of the mating slot 10.

Referring to FIGS. 17 to 20, in the second embodiment of the present disclosure, the mating slot 10 is in parallel to the mounting surface 12. This arrangement is beneficial to appropriately reduce the height of the electrical connector 200.

Compared with the prior art, the plurality of first conductive terminals 22 or the plurality of second conductive terminals 32 include at least one radio frequency signal terminal for transmitting a radio frequency signal. In this way, the electrical connector 200 can transmit a radio frequency signal through an electrical connector with a general structure, thereby simplifying the structure of the electrical connector 200. In the embodiment shown in the present disclosure, the radio frequency signal terminal includes the first radio frequency signal terminal RF1 and the second radio frequency signal terminal RF2. In the present disclosure, the plurality of first conductive terminals 22 and the plurality of second conductive terminals 32 are respectively provided with the first radio frequency signal terminal RF1 and the second radio frequency signal terminal RF2 for transmitting a radio frequency signal, so that the electrical connector 200 can transmit at least two sets of a radio frequency signal simultaneously. This increases the signal density of the electrical connector 200, and reduces cost while satisfying performance. In order to further increase the signal density and improve the transmission rate of the radio frequency signal, the plurality of first conductive terminals 22 can be provided with two or more first radio frequency signal terminals RF1, and the plurality of second conductive terminals 32 can be provided with two or more second radio frequency signal terminals RF2.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface and a mating slot extending through the mating surface, the mating slot being adapted for receiving a mating board;

a plurality of first conductive terminals, each of the first conductive terminals comprising a first extension arm, the first extension arm comprising a first mating portion which protrudes into the mating slot; and a plurality of second conductive terminals, each of the second conductive terminals comprising a second extension arm, the second extension arm comprising a second mating portion which protrudes into the mating slot;

wherein the first mating portion and the second mating portion are located on opposite sides of the mating slot, respectively; the first mating portion and the second mating portion are adapted to jointly clamp the mating board; and extension directions of the first extension arm and the second extension arm are opposite to each other; and wherein the plurality of first conductive terminals or the plurality of second conductive terminals comprise at least one radio frequency signal terminal;

wherein the electrical connector further comprises a first terminal module and a second terminal module; the first terminal module comprises a first insulating block and the plurality of first conductive terminals secured to the first insulating block; the second terminal module comprises a second insulating block and the plurality of second conductive terminals secured to the second insulating block;

wherein the plurality of first conductive terminals comprise a first radio frequency signal terminal, a first ground terminal and a second ground terminal, the first ground terminal and the second ground terminal are located on opposite sides of the first radio frequency signal terminal; the first terminal module further comprises a first shielding piece mounted to the first insulating block, the first shielding piece is located between the first fixing portion and the second fixing portion, and the first shielding piece connects the first fixing portion of the first ground terminal and the first fixing portion of the second ground terminal in series; and wherein the plurality of second conductive terminals comprise a second radio frequency signal terminal, a third ground terminal and a fourth ground terminal, the third ground terminal and the fourth ground terminal are located on opposite sides of the second radio frequency signal terminal; the second terminal module further comprises a second shielding piece mounted to the second insulating block, the second shielding piece is located between the first fixing portion and the second fixing portion, and the second shielding piece connects the second fixing portion of the third ground terminal and the second fixing portion of the fourth ground terminal in series; and wherein the at least one radio frequency signal terminal comprises the first radio frequency signal terminal and the second radio frequency signal terminal.

2. The electrical connector according to claim 1, wherein the first terminal module and the second terminal module are located on opposite sides of the insulating body, respectively.

3. The electrical connector according to claim 2, wherein the insulating body comprises a first side located on a same side as the mating surface, a second side opposite the first side, a first receiving space recessed from the first side toward the second side, and a second receiving space recessed from the second side toward the first side; the first terminal module and the second terminal module are assembled to the insulating body along opposite directions; the first insulating block is received in the first receiving space, and the second insulating block is received in the second receiving space.

4. The electrical connector according to claim 2, wherein each first conductive terminal comprises a first fixing portion connected with the first extension arm and a first tail portion for being fixed to a circuit board; and the first fixing portions of the first conductive terminals are insert-molded with the first insulating block;

wherein each second conductive terminal comprises a second fixing portion connected with the second extension arm and a second tail portion for being fixed to the circuit board; the second fixing portions of the second conductive terminals are insert-molded with the second insulating block; and wherein each of the first tail portions extends horizontally in a direction away from the second tail portions, and each of the second tail portions extends horizontally in another direction away from the first tail portions.

5. The electrical connector according to claim 4, wherein the first mating portions and the second mating portions are both located between the first tail portions and the second tail portions in a front-rear direction.

6. The electrical connector according to claim 4, wherein the first fixing portion and the second fixing portion extend in a vertical direction; the first shielding piece extends along the vertical direction;

wherein the second shielding piece extends along the vertical direction.

7. The electrical connector according to claim 4, wherein each first conductive terminal comprises a first bent portion bent from a bottom of the first fixing portion toward the second fixing portion, and a second bent portion bent downwardly from the first bent portion; and wherein the first tail portion is horizontally bent from a bottom of the second bent portion.

8. The electrical connector according to claim 1, wherein the plurality of first conductive terminals and the plurality of second conductive terminals are staggered along a front-rear direction.

9. The electrical connector of claim 1, wherein the insulating body comprises a top wall, a first side wall connected to one side of the top wall, and a second side wall connected to another side of the top wall; the mating slot is located between the first side wall and the second side wall; the insulating body further comprises a bottom wall opposite to the top wall, and the mating slot is located between the top wall and the bottom wall; wherein the bottom wall is only located on a side adjacent to the first side wall or the second side wall.

10. The electrical connector according to claim 1, wherein the insulating body comprises a mounting surface for being mounted on a circuit board; and wherein the mating slot is parallel to the mounting surface; or the mating slot and the mounting surface form an comprised angle less than 90°.

11. An electrical connector, comprising:

an insulating body comprising a mating surface and a mating slot extending through the mating surface, the mating slot being adapted for receiving a mating board;

a first terminal module assembled to the insulating body, the first terminal module comprising a first insulating block and a plurality of first conductive terminals secured to the first insulating block, each of the first conductive terminals comprising a first extension arm, the first extension arm comprising a first mating portion which protrudes into the mating slot; and a second terminal module assembled to the insulating body, the second terminal module comprising a second insulating block and a plurality of second conductive terminals secured to the second insulating block, each of the second conductive terminals comprising a second extension arm, the second extension arm comprising a second mating portion which protrudes into the mating slot;

wherein the first mating portion and the second mating portion are located on opposite sides of the mating slot, respectively; the first mating portion and the second mating portion are adapted to jointly clamp the mating board; wherein the first terminal module and the second terminal module are assembled to the insulating body along opposite directions;

wherein the plurality of first conductive terminals or the plurality of second conductive terminals comprise at least one radio frequency signal terminal;

wherein the plurality of first conductive terminals comprise a first radio frequency signal terminal, a first ground terminal and a second ground terminal, the first ground terminal and the second ground terminal are located on opposite sides of the first radio frequency signal terminal; the first terminal module further comprises a first shielding piece mounted to the first insulating block, the first shielding piece is located between the first fixing portion and the second fixing portion, and the first shielding piece connects the first fixing portion of the first ground terminal and the first fixing portion of the second ground terminal in series;

wherein the plurality of second conductive terminals comprise a second radio frequency signal terminal, a third ground terminal and a fourth ground terminal, the third ground terminal and the fourth ground terminal are located on opposite sides of the second radio frequency signal terminal; the second terminal module further comprises a second shielding piece mounted to the second insulating block, the second shielding piece is located between the first fixing portion and the second fixing portion, and the second shielding piece connects the second fixing portion of the third ground terminal and the second fixing portion of the fourth ground terminal in series; and wherein the at least one radio frequency signal terminal comprises the first radio frequency signal terminal and the second radio frequency signal terminal.

12. The electrical connector according to claim 11, wherein the first terminal module and the second terminal module are located on opposite sides of the insulating body, respectively.

13. The electrical connector according to claim 11, wherein the insulating body comprises a first side located on a same side as the mating surface, a second side opposite the first side, a first receiving space recessed from the first side toward the second side, and a second receiving space recessed from the second side toward the first side; the first insulating block is received in the first receiving space, and the second insulating block is received in the second receiving space.

14. The electrical connector according to claim 11, wherein each first conductive terminal comprises a first fixing portion connected with the first extension arm and a first tail portion for being soldered to a circuit board; and the first fixing portions of the first conductive terminals are insert-molded with the first insulating block;

wherein each second conductive terminal comprises a second fixing portion connected with the second extension arm and a second tail portion for being soldered to the circuit board; the second fixing portions of the second conductive terminals are insert-molded with the second insulating block; and wherein each of the first tail portions extends horizontally in a direction away from the second tail portions, and each of the second tail portions extends horizontally in another direction away from the first tail portions.

15. The electrical connector according to claim 14, wherein the first mating portions of the first conductive terminals and the second mating portions of the second conductive terminals are located between the first tail portions and the second tail portions in a front-rear direction.

16. The electrical connector according to claim 14, wherein the first fixing portion and the second fixing portion extend in a vertical direction; the first shielding piece extends along the vertical direction;

wherein the second shielding piece extends along the vertical direction.

17. The electrical connector according to claim 14, wherein each first conductive terminal comprises a first bent portion bent from a bottom of the first fixing portion toward the second fixing portion, and a second bent portion bent downwardly from the first bent portion; and wherein the first tail portion is horizontally bent from a bottom of the second bent portion.

18. The electrical connector according to claim 11, wherein a length of the second extension arm is greater than a length of the first extension arm; and wherein the second terminal module further comprises a fixing block fixed to the second extension arm to adjust elastic force of the second extension arm.

19. The electrical connector of claim 11, wherein the insulating body comprises a top wall, a first side wall connected to one side of the top wall, and a second side wall connected to another side of the top wall; the mating slot is located between the first side wall and the second side wall; the insulating body further comprises a bottom wall opposite to the top wall, and the mating slot is located between the top wall and the bottom wall; wherein the bottom wall is only located on a side adjacent to the first side wall or the second side wall.

20. The electrical connector according to claim 11, wherein the insulating body comprises a mounting surface for being mounted on a circuit board; and wherein the mating slot is parallel to the mounting surface; or the mating slot and the mounting surface form an comprised angle less than 90°.

* * * * *